United States Patent [19]

Mattson et al.

[11] Patent Number: 4,779,206
[45] Date of Patent: Oct. 18, 1988

[54] APPARATUS AND PROCESS FOR VULCANIZING, ADJUSTED FOR GREEN TIRE TEMPERATURE, WITHOUT LOCATING POINT OF LEAST CURE

[75] Inventors: William F. Mattson, Hinckley; Michael J. Keryan, Tallmadge, both of Ohio

[73] Assignee: The Uniroyal Goodrich Tire Company, Akron, Ohio

[21] Appl. No.: 917,880

[22] Filed: Oct. 10, 1986

[51] Int. Cl.$^4$ ................... B29C 35/02; B29C 37/00
[52] U.S. Cl. ................... 364/476; 264/40.1; 264/40.6; 425/143; 425/29
[58] Field of Search ........... 264/40.1, 40.6, 315, 264/326; 425/29, 30, 36, 52, 143, 144; 364/473, 476

[56] References Cited

U.S. PATENT DOCUMENTS

| | | | |
|---|---|---|---|
| 3,718,721 | 2/1973 | Gould et al. | 264/40.6 |
| 4,371,483 | 2/1983 | Mattson | 425/29 |
| 4,517,146 | 5/1985 | Takasu et al. | 264/315 |

Primary Examiner—Jan H. Silbaugh
Assistant Examiner—Neil M. McCarthy
Attorney, Agent, or Firm—Alan A. Csontos; Alfred D. Lobo

[57] ABSTRACT

A curing press for tires is operated with a minimum curing time which will provide the near-optimum number of cure equivalents at the point of least cure without locating it. An average temperature for a particular period during the year is "set" in a programmable controller ("PC") based on minimum and maximum temperature measurements made in the curing room during the day and night over a preselected period of time. The actual ambient temperature is measured at the press, which temperature is essentially that of the green tire just before it is loaded in the prss. The PC controls operation of the press, and is used to provide a near-optimum but variable curing period, depending upon the difference between the "set" temperature and the actual (green tire) temperature, and whether it is greater than, or less than the "set" temperature, to provide a near-perfect cure without tracking the point of least cure.

9 Claims, 3 Drawing Sheets

APPARATUS AND PROCESS FOR VULCANIZING, ADJUSTED FOR GREEN TIRE TEMPERATURE, WITHOUT LOCATING POINT OF LEAST CURE

BACKGROUND OF THE INVENTION

This invention relates to vulcanizing ("curing") green tires in a split mold cavity within a curing press, such as an automatic curing press, a pot heater, or other curing means. An insertable bladder is inserted in a green tire which is shaped, then cured when high temperature steam, water or other curing fluid is introduced into the bladder, this being the conventional manner in which green tires are cured.

The simple fact that the cost of producing a tire can be reduced by reducing the period of time it takes to cure a tire has sensitized tire manufacturers to the criticality of saving a fraction of a minute in the curing cycle. Over the years, the effort to minimize curing time without sacrificing quality, has been unremitting. This effort has included using higher curing temperatures, changes in rubber compounding, mechanical improvements in the curing presses, improvements in the valving, and switching from lower pressure steam to higher pressure steam. Details about such systems are referred to in U.S. Pat. Nos. 2,066,265; 3,489,833; 3,579,626; 4,027,543; 4,126,657; 4,371,483; and 4,490,325.

A typical press cycle for a passenger tire is in the range from about 10 to about 20 minutes; the sum of the times required for each of plural shaping stages is generally less than 45 secs. In a Bag-0-Matic or Autoform press, the press cycle commences with closing of the press which actuates the timer for the curing cycle; the press cycle ends when the press opens after blowdown. For economic reasons, it is desirable to shrink each period for loading, shaping, curing the tire, and blowing down the bladder, to the minimum. Saving 30 secs in the curing cycle of a passenger tire not only avoids overcuring the tire but may add up, over a period of time, to a several million dollar advantage for a manufacturer, provided of course, thus the cure can be accomplished without sacrificing the cured quality of the tire produced. To this end, the '843 patent sought to provide a perfect cure.

By "shaping" we refer to the initial inflation of the bladder to permit it to press against the inner surfaces of a radial tire uniformly and thus displace air between the bladder and the tire, and the tire and the mold; for a bias tire, it is more critical that the air between the tire and the mold be displaced. Shaping may be done in several steps. For example, the pressures may be sequentially increased from 2 psig to 5 psig, then to 10 psig, and held for a different interval of time at each pressure level. The internal pressure during the curing step may likewise be "stepped" and held at each pressure level for a different interval of time. A curing press equipped with a programmable controller ("PC") programmed to shape a tire as a function of pressure is disclosed in application Ser. No. 898,965 filed Aug. 21, 1986, which is now U.S. Pat. No. 4,744,931, the disclosure of which is incorporated by reference thereto as if fully set forth herein.

Those skilled in the art of curing tires will recognize that a tire is fully cured to desired "cured specifications" when the blowdown portion of the curing cycle is commenced, though some additional curing will continue while the tire is being blowndown, and even after it is removed from the curing press. But such additional curing, or overcuring, is not part of the essential curing covered by or within the cured specifications. Overcuring is generally undesirable, though some overcuring at the outer portions of a tire is to be expected when precisely adequate curing is provided at the point of least cure.

Presses commonly used for curing tires include Bag-O-Matic brand presses manufactured by McNeil Corp., and those known by the trademark Autoform, manufactured by NRM Corp., both of Akron, Ohio. These types of presses are automated and employ separable mold halves with center shaping and curing mechanisms using an inflatable bladder means. Each press may include a single, but usually two, simultaneously operated molds and the press is preferably individually controlled by its own PC and the necessary instrumentation and hardware which allows a press to be operated automatically. The shaping and blowdown instructions, specifically, for the PC, and the curing instructions generally, may be downloaded from a central computer each time the press cycle is to be changed.

A curing press may also be of the 'pot-heater' type referred to in the '483, in which a stack of split-molds loaded with green tires is formed within a pressure vessel closed at the top, with a dome having a butt-plate against which the stack is biased by a hydraulic platform on which the stack rests. Conventional pot-heaters are of the type manufactured by United McGill of Columbus, Ohio or Pennsylvania Engineering Corp. of New Castle, Pa., inter alia.

As disclosed in the '483 patent, green tire (ambient) temperature is an essential element in the determination of the optimum number of cure equivalents or cure time for the tire. Green tire temperature is generally assumed to be the same as ambient temperature at the site of a curing press because the green tire is held in the press's loading means during the curing cycle of the preceding tire being cured. The problem of adjusting the curing cycle of a press to reflect the temperature of a green tire about to be loaded into it is a particularly serious one in those climates where wide fluctuations in temperature not only from month to month, but from day to day, cause the ambient temperature of a curing room to vary widely. A typical curing room may house a hundred, and often, up to several hundred curing presses; it is not uncommon to find the ambient temperature at the site of a press near one end of the curing room different from that at the other end by 10° F. or more. This variation is routinely large during winter in the northern portions of the country, and therefore, particularly noteworthy because the green tire temperature affects the shaping and curing of the tire substantially.

In the aforementioned '843 patent, the disclosure of which is incorporated by reference thereto as if fully set forth herein, I have disclosed how to adjust the curing of a tire by tracking the location of the point of least cure. The location of this point varies depending upon a host of variables, but the precise optimum number of cure equivalents is delivered to the point so tracked, without human attention during the process. This permitted a "perfect" cure (because the precise number of cure equivalents are provided at the actual point of least cure) to cure the tire in an "elapsed cure equivalent" mode, this being preferable to operation of a curing press in an "elapsed time" mode.

The problem is that operation of a curing press in the elapsed cure equivalent mode, by tracking the point of least cure, can only be justified for those tires where the cost of failing to meet the desired cured specifications is much greater than the relatively high cost of curing the tire. Stated differently, the patented invention is particularly applicable for those tires where a "near-perfect" cure is not good enough. Without using the actual point of least cure, nor an approximated one, in the program for the PC, we get an accurate, though not precise, curing time for any tire with a particular configuration. For most passenger car tires the "near-perfect" cure is more than good enough, and the economics of providing it such a cure are good.

By "curing time" I refer specifically to the duration of the curing period. The curing period is that period between the shaping period and the blowdown period. The curing period commences with the closing of the press (upon completion of shaping), and ends with initiation of the blowdown period. The goal is neither to undercure the tire nor to overcure it any more than is dictated by the known range of variations of other factors, for example compounding of the rubber in the belts and tread, variations in construction of the tire, inter alia, the degree of which variations is approximated from experience.

A tire is undercured when it is cured for less time than is required to ensure that it is cured at the point of least core. Of course, one always makes certain a tire is never undercured, but the larger the extent of the overcuring, the poorer the cured characteristics of the tire, and the additional time used in the curing cycle adds to the cost of the cured tire. Stated differently, time not wasted in the curing cycle, not only saves overcuring the tire but also is time saved in each cycle.

The blowdown portion of the cycle is the time it takes to purge steam from the bladder in each mold cavity until the pressure is sufficiently low to open the mold. Depending on numerous factors which are detailed in patent application Ser. No. 888,896 filed July 24, 1986, which is now U.S. Pat. No. 4,721,590, the disclosure of which is incorporated by reference thereto as if fully set forth herein, this period was fixed in the prior art by a timer for each press and is about 30 sec for a passenger tire. If, for some reason, the pressure in the bladder is not low enough, the press will not open because of a pressure safety switch which mechanically responds to pressure on a diaphragm. The safety switch is set for a pressure low enough so as not to injure an operator who happens to be close by when the press opens. Such pressure is in the range from about 3 psig to about 5 psig.

By chance we recognized that a simple correlation existed between ambient temperature and the required cure time, which correlation, though unable to provide a precise optimum number of cure equivalents at a point of least cure refined for three-dimensional thermal diffusion within the tire, was accurate enough for all but the most demanding cure specificiations. We were determined to identify and refine that correlation, then utilize it in the PC. In this invention, we have done so.

SUMMARY OF THE INVENTION

A simple correlation has been identified between the actual ambient temperature ($T_{act}$) adjacent a curing press (or green tire temperature), and the time required for providing a "near-perfect" cure of a tire in the press being operated in an elapsed time mode, unrelated to the actual point of least cure which is not tracked; and, it has been discovered that this correlation may be programmed into a PC to adjust the curing period to provide a cure accurate nough to avoid undercuring the tire, yet without overcuring it more than a predetermined amount estimated from factors other than temperature.

Accordingly it is a general object of this invention to provide a curing press with a PC which utilizes a predetermined correction constant applicable to all tires of a particular configuration, and, in combination with a ($T_{act}$) temperature sensing means, controls each curing press cycle, at the end of which each tire is near-perfectly cured; and, the duration of each curing period will be different for each green tire if its ($T_{act}$) is different from that of the preceding tire cured.

It is therefore a general object of this invention to provide an apparatus and method for providing a near-perfect cure for a green tire, using an inflatable bladder means insertable therewithin, comprising, measuring an average ambient temperature ($T_{avg}$) in a curing room during a preselected period ot time, and setting an average curing time for a preselected green tire to be loaded in a curing press at said ($T_{avg}$);

sensing ($T_{act}$) at a location adjacent the curing press, in which location the green tire is held before it is loaded in the press;

deriving the difference between the ($T_{avg}$) and the sensed ($T_{act}$);

obtaining a corrected curing time by correcting the average curing time, by (i) adding to it, when the ($T_{act}$) is less than the ($T_{avg}$), the amount of time derived by multiplying said difference by a correction constant and by the average curing time, and, (ii) subtracting from it, when the ($T_{act}$) is greater than the ($T_{avg}$), the amount of time derived by multiplying said difference by said correction constant and by the average curing time; and, completing the curing of the tire within a curing period in an elapsed time mode, said curing period being sufficiently accurate to provide at least the required number of cure equivalents at the point of least cure, without tracking the point of least cure.

It is a specific object of this invention to provide a temperature sensing means for sensing the ($T_{act}$) at the beginning of each cycle of a press's operation ("press cycle"), in combination with a PC having ($T_{avg}$) loaded into a sequence of instructions to control the curing of a tire in a curing press, because it has been found that a correction constant can be applied to the difference in average and actual temperatures, which constant provides a corrected curing time for a near-perfect cure at a predetermined point of least cure without tracking the actual point of least cure; and the PC is provided with no instruction as to the location of the predetermined point of least cure.

BRIEF DESCRIPTION OF THE DRAWINGS

The foregoing and other objects and advantages of my invention will appear more fully from the following description, made in connection with the accompanying drawings of preferred embodiments of the invention, wherein like reference characters refer to the same or similar parts throughout the views and in which.

DETAILED DESCRIPTION OF PREFERRED EMBODIMENTS

This invention is particularly adapted for use in a curing room in which each of plural curing presses is automatically loaded with green tires which are placed in each mold cavity by a "loader", shaped, then cured in a predetermined sequence of operations controlled by a PC. The following description of the most preferred embodiment of the invention is with respect to a radial passenger car tire cured in a Bag-O-Matic press using an "all steam" curing process which is conventional.

After shaping with low pressure steam, steam at about 100 psig is supplied to the curing bladder for from about 15 secs to about 1 min. The main curing is effected by introducing 200-300 psig steam for the major portion of the curing cycle, usually between 10 min and about 20 min, depending mainly upon the size and configuration of the tire, and to a lesser extent upon its compounding. Then the pressure is dropped to about 100 psig, held at this level for from 10-40 secs., and the bladder is then blowndown down by a procedure more fully described in patent application Ser. No. 888,896 filed July 24, 1986, which is now U.S. Pat. No. 4,721,590, the disclosure of which is incorporated by reference thereto as if fully set forth herein.

The steam pressure and corresponding temperature do not change from one cycle to another, but the time of the curing period is regulated by the PC, based on the input of the ambient temperature sensing means and the correction constant loaded into the program, to assure adequate curing at the point of least cure in the tire. This is known to be a point 'a' in the tread shoulders (see FIG. 1), which is not provided to the PC. Point 'b' identifies a point near the crown of a tire, point 'c' one on its outer surface, and point 'd' one on the inner surface of the carcass.

Figure 1:
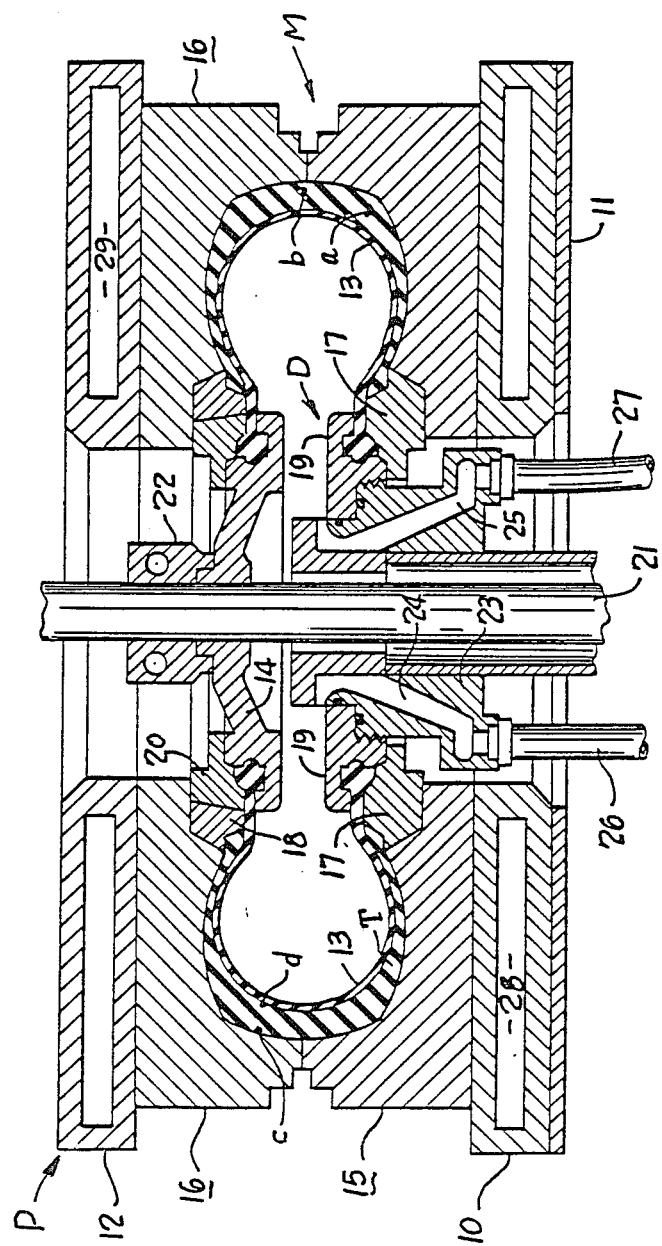
FIG. 1 is a partial vertical cross-sectional view on a reduced scale, showing the conventional type of equipment including a shaping and vulcanizing press (curing press) and a tire mold.

Referring further to FIG. 1 there is shown a platen press P and a tire mold M during curing of a standard tire T. The drawing is schematic with parts omitted, and the mold and the press are not drawn to scale. The platen press P may be a standard type of "Bag-O-Matic" press substantially as shown and described, for example, in U.S. Pat. No. 2,808,618 and other patents of L. E. Soderquist.

As shown herein press P includes a fixed platen 10, a bed 11 and a platen 12 rigidly mounted on the movable upper portion of the press (not shown). As indicated in the last-named patent, conventional means are provided for raising, lowering and tilting the entire upper assembly. A conventional bladder mechanism D is provided at the center of the press having a curing bladder or diaphragm 13 as indicated in the aforesaid patent and in U.S. Pat. No. 2,775,789.

The upper and lower halves 15 and 16 of the tire mold M are rigidly connected to the platens 10 and 12. A multiplicity of vent passages (not shown) extend from the toroidal mold cavity to the exterior of the mold. The bladder mechanism D has lower and upper bead positioning rings 17 and 18 and a lower diaphragm clamping ring 19. Upper diaphragm clamping rings 14 and 20 fit within the bead ring 18. Clamping rings 14 and 20 are moved vertically by a piston rod 21 having an attaching collar 22. An annular support member 23 has a pair of passages 24 and 25 in communicaton with inlet and outlet conduits 26 and 27 to permit free flow of steam to and from the bladder 13. Each of said passages may have a cross section elongated in the circumferential direction.

The press P is heated by supplying steam to the annular chambers 28 and 29 of the lower and upper platens, and, if desired, the heating may be continuous to maintain a substantially constant temperature.

In a typical two-cavity press, two assemblies described hereinabove are installed to cure two tires at a time. The second mold in the two-cavity press has an analogous bladder deployed within a tire placed in the upper mold half around the center bladder mechanism and piston rod, and inlet and outlet ports connected to a platen-supply inlet and outlet lines, in a manner analogous to that described for the first mold (not shown), all of which is conventional and forms no part of the invention.

The average ambient temperature ($T_{avg}$) of the curing room is arrived at by measuring temperatures during the day and night, and deriving an average temperature for a 24 hr period; from a multiplicity of such derivations, seriatim, a base reference temperature is derived for a particular period of the year. Since a curing room operates around the clock, the ($T_{avg}$) of interest may be over a short duration of a day or less, or a longer one of several months to reflect a season. A short duration can be as little as 12 hr in a curing room in which the temperature changes greatly from the middle of the day to the middle of the night, say a temperature swing greater than about 20° F. or 10° C. A longer duration may be for a week, a month, or two or more months.

Figure 3:
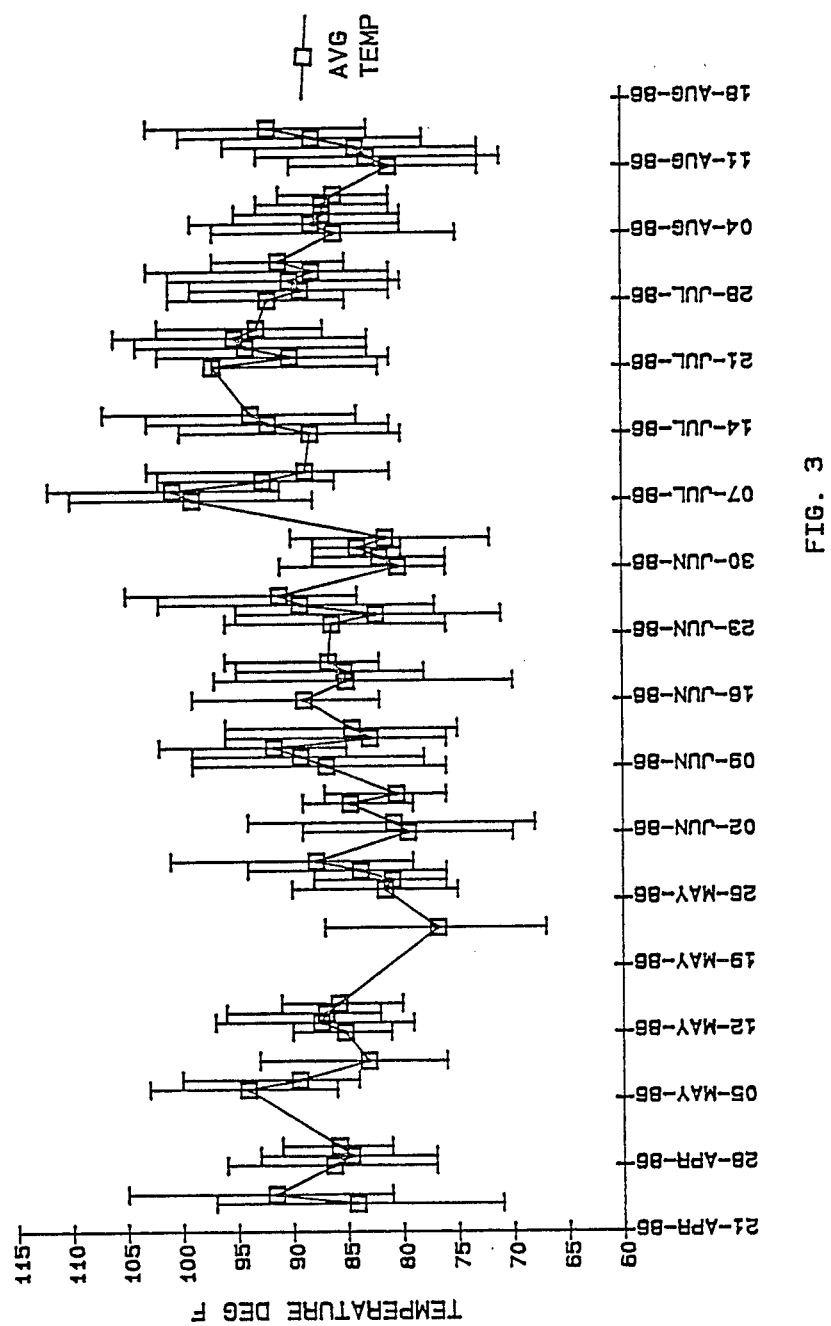

The ($T_{avg}$) temperature is derived by measuring hourly temperatures at several locations (say five) in the curing room. The average temperature over each 12 hr, or 24 hr, period is then computed. The temperature swing from day to day, and from week to week, for a curing room in Fort Wayne, Ind. is plotted in FIG. 3 over the period from April 23 to August 19 in the year 1986. The ($T_{avg}$) used as the base reference temperature will depend on how large a difference one is willing to tolerate between the ($T_{avg}$), and the actual ambient temperature ($T_{act}$) at a particular press at a particular time.

The shorter the period over which the ($T_{avg}$) is measured, the better the likelihood that the difference between the ($T_{avg}$) and the ($T_{act}$) will be relatively small. If there is no difference then there will be no correction to be made.

It will be evident that if the curing time is set for (i) an ($T_{avg}$) which is the same as the actual (isothermal curing room), and (ii) a particular configuration of a green tire, and (iii) each green tire is exactly like another to be cured in the press, then no correction in curing time will be necessary. Since a curing room is not isothermal, the correction becomes necessary and a ($T_{avg}$) is "set" at a particular address in the program of the PC of each press. A ($T_{avg}$) computed over a period of one month provides satisfactory accuracy for passenger tires.

The "set" ($T_{avg}$) temperature in the PC of each press is changed (when needed) at each press individually, with a portable terminal having a keyboard which interfaces with the PC, and the temperature is changed at a specific address. An alternative system permits the change to be downloaded from the "host" computer, provided of course that the change is made on each press when it is "down", that is, not in operation.

Irrespective of the difference between the average and actual ambient temperatures, a correction constant of about 0.002 per degree Fahrenheit ("0.002/° F.") of difference will provide the near-optimum number of cure equivalents at the point of least cure. This correction constant is about 0.0011 per degree Celsius ("0.0011/° C."). The correction constant for large and small tires may be slightly different for enhanced accuracy, the precise difference in the constant used being arrived at with a little trial and error.

The correction constant is determined by an analytical approximation of curing times weighted by various measured (actual) green tire temperatures for several tires of varying size and tread configuration. For passenger tires in the typical range of those which are used on small 13" rims, to those used on 15" rims, this empirically determined constant happens to be 0.002/° F. of difference. The corrected curing time obtained with the correction constant is most accurate when the difference between $T_{avg}$ and $T_{act}$ is less than 30° F. (16.67° C.).

The PC is loaded with the base reference "set" time, $T_{avg}$ for a curing period. This "set" time is modified after the PC performs the multiplication, and subtraction or addition, to get the modified time. For example, if the curing cycle at the $T_{avg}$ will take 15 min, and the difference between $T_{avg}$ and $T_{act}$ is +10° F. on a Winter day, then the corrected curing time will be 18 sec longer, that is, 15 min and 18 sec. If the difference is −20° F. on a Summer day, then the corrected curing time will be 36 sec shorter, that is, 14 min and 24 sec.

No allowances have been made in the sequence of instructions (for modifying the curing time as described above), for statistical variations in compounding of the rubber, and for variations in gauge and other construction variables which may vary from being insignificant in one tire plant, to being dominant in another, depending upon the quality control of the variations in each particular tire plant. Where such variations are significant it may be desirable to "lock in" a "safety curing period" which would be added to every curing cycle, after it was modified by the PC.

Though, for best accuracy, the corrected curing period is based on the period of time commencing from closing of the press to initiation of blowdown of the bladder (the curing period), an approximation may be made to facilitate programming the PC. This approximation uses the press cycle, which is the period commencing from closing of the press to the opening of the press after blowdown, instead of the curing period. Since the blowdown period is typically less than about 30 sec, this approximation may be made without substantial loss of near-perfect curing accuracy. This approximation facilitates programming of the PC.

Figure 2:
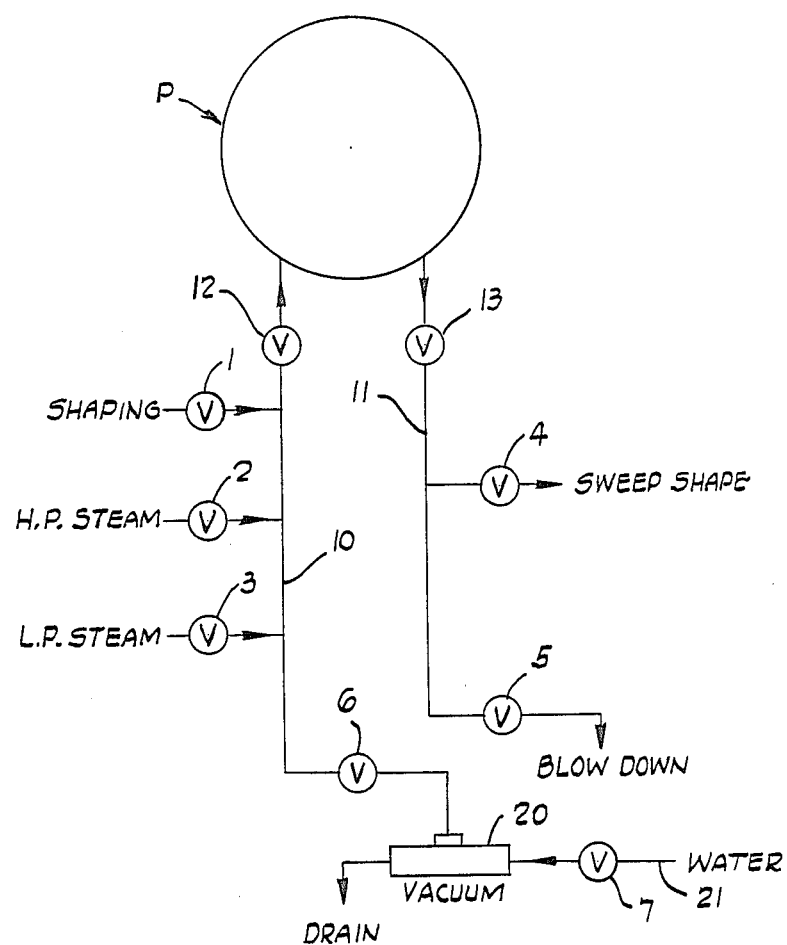
FIG. 2 is a diagrammatic plan view showing the valves and piping for controlling flow of steam to and from the curing bladder of a typical press; and, FIG. 3 is a chart of the daily temperatures in a particular location of a curing room in Fort Wayne, Ind., over a four-month period.

The press and related apparatus schematically illustrated in FIG. 2 includes valves 1 through 5 and other valves for controlling flow of steam to and from the curing bladder of the press P through inlet and outlet conduits 10 and 11. Valves 12 and 13 in the latter conduits are normally open and can be closed to stop such flow when the press P is out of service.

The valve 1 controls the flow of shaping steam designated "shaping"; valve 2 controls the flow of high-pressure (250 psig) steam designated "H.P. Steam", and valve 3 controls the flow of low pressure "entry" steam designated "L.P. Steam". Valve 4, dentified as "sweep shape" controls flow of steam from the sweep-shaping stage, and valve 5 identified as "blowdown", controls flow of blowdown steam from the outlet conduit 11. Valve 6 controls flow from the inlet conduit 10 to the vacuum pump 20. The latter is a venturi-type pump receiving water through cut-off valve 7 and conduit 21.

To cure a tire after shaping, the inlet conduit at 3 is supplied with low pressure "entry" steam in the range from about 50 psig to 150 psig for about 30 sec, after which high pressure saturated steam at about 250 psig is led into the bladder through the inlet conduit for valve 2.

In a particular sequence of curing steps, all the valves 1 through 7 are initially closed (at the beginning of a cycle), except valve 5 which is open. After the green tire is positioned on the lower mold half 15, the valve 5 is closed and the valve 1 is opened to admit shaping steam to the bladder 13 at a pressure in the range from about 2 psig to about 20 psig until the tire approaches its full size. Valve 4 is opened to allow sweep shaping steam to leave. The press then closes and locks in the losed position (FIG. 1). The valve 3 is then opened to admit the "entry" steam (i.e. at 100 psig, say) to the inlet conduit 10 while outlet 11 is obstructed or cut off. After this initial steam heating stage, valve 2 is opened to provide steam at 250 psig. After the curing period dictated by the sequence of instructions in a programmable controller ("PC"), valve 2 is closed and the pressure dropped to 100 psig for about 15 sec, after which the blowdown valve 5 is opened fully. When the pressure in the bladder drops to a safe level, say 3 psig, the press opens.

The sequence of operations is controlled by a sequence control means in the form of the "PC" which includes means for storing and executing a sequence of instructions which determine the intervals of time for shaping the tire, and then curing it with curing fluid at a high enough temperature and pressure to effect the cure in a predetermined period of time. Though reference is made herein to the curing fluid being steam, it will be appreciated that water or another gas, such as carbon dioxide or nitrogen may also be used.

A PC in one of several models is commercially available, typified by an Allen Bradley Model 2/30. Multiple set points may be set, so that the period determined by the setting of each set point is variable. The instructions determine the intervals of time for each operation through the operation of valve events which are controlled by the PC, as are the sequence of pressure events within the bladder.

Operation of the press is commenced when loading (a radial passenger green tire) is initiated to activate press operation. The tire loader carries the green tire into the press and holds it in a centered position over the bladder assembly with the bottom bead just above the bead ring in the lower mold half. Preform shaping steam enters the blader immediately after loading the press with the green tire. Ring drop occurs after the initial shaping pressure (first shaping pressure) in each bladder has reached approximately 2 psi and is activated by a pressure switch set at 2 psi. The pressure switch also activates a timer which times out the chuck release before the loader exits. The timer is set for 4 to 6 seconds, depending upon the speed of the center mechanism. When the loader exits, the press closes.

A second shaping pressure which is higher than the first, is activated about 30 ins before the press closes. A third shaping pressure which is higher than the second is activated about 10 ins before the press closes. The precise level of shaping pressures for the second and third steps will depend upon the tire and bladder combination, but the third stage pressure is always less than about 20 psig. Typically the second shaping pressure is 12 psig and the third is 15 psig. The preform shaping steam pressure is on sweep shape through valve 4 and continues to approximately 4 ins from press close, at which time valve 4 is closed (blocked off).

The interval of time during which shaping fluid is held in the bladder to shape the tire, is programmed into, and thus fixed in the PC. Routinely, the shaping is effected in three stages, details of which are of no particular concern in the curing cycle, particularly since the entire shaping period is usually less than a minute of the overall press cycle.

Blowdown is initiated by closing valve 2 and opening valve 5 to relieve pressure in the bladder and to vent the bladder to the blowdown manifold which is nominally expected to be at atmospheric pressure. Blowdown is typically completed in less than a minute, and the details of blowdown are conventional and of no particular concern in the curing cycle.

From the foregoing description of the best mode of the invention, it will now be evident that use of a PC which is provided with means to store the average (base reference) temperature in a curing room for a particular period of the year, and means to modify that temperature with an empirically derived constant, depending upon the variation of actual temperature, can provide an accurate and efficient cure. It will assure that a tire is not undercured, and it will avoid the routine overcuring of a tire, which is typical, to compensate for a low green tire temperature in the curing room.

I claim:

1. Apparatus for curing a green tire in a split mold which is heated internally and externally in a curing press located in a curing room having an average temperature ($T_{avg}$) over a preselected period of time, comprising,
    (a) timing means for measuring time, and setting an average curing time for said green tire;
    (b) temperature sensing means for sensing the actual temperature ($T_{act}$) at a location adjacent the curing press, in which location the green tire is held before it is loaded in the press;
    (c) programmable controller (PC) means including means for storing and executing a sequence of instructions determinative of a near-optimum interval of time for curing said tire and thereafter curing it with a curing fluid at adequate temperature and sufficient pressure for the purpose, said PC means comprising,
        (i) means to derive the difference in temperature between said ($T_{avg}$) and the sensed ($T_{act}$); and,
        (ii) means to obtain a corrected curing time by (aa) adding to the average curing time, when the ($T_{act}$) is less than the ($T_{avg}$), the amount of time derived by multiplying said difference by a correction constant and by the average curing time, and, (bb) subtracting from the average curing time, when the ($T_{act}$) is greater than the ($T_{avg}$), the amount of time derived by multiplying said difference by said correction constant and by the average curing time;
    whereby the tire is cured within a curing period in an elapsed time mode, said curing period being the corrected curing time as obtained by the means in (ii) above and said curing time being sufficiently accurate to provide a near-optimum number or cure equivalents at the point of least cure, without tracking the point of least cure.

2. The apparatus of claim 1 wherein said correction constant is about 0.002 for each degree Fahrenheit of said difference (0.002/° F.), or about 0.0011 for each degree Celsius of said difference (0.0011/° C.) for passenger car tires.

3. The apparatus of claim 1 wherein said curing fluid is steam, and, said difference in temperature is less than 30° F. (16.67° C.).

4. The apparatus of claim 3 wherein said curing period is the period commencing with closing of said curing press to initiation of blowdown thereof.

5. The apparatus of claim 3 wherein said curing period is the duration of the press cycle.

6. A method for curing a green tire in a split mold which is heated internally and externally in a curing press located in a curing room having an average temperature ($T_{avg}$) over a preselected period of time, comprising,
    (a) setting an average curing time for said green tire at said $T_{avg}$ in a programmable controller (PC) means;
    (b) sensing the actual temperature ($T_{act}$) at a location adjacent the curing press, in which location the green tire is held before it is loaded in the press;
    (c) storing in said PC, and executing, a sequence of instructions determinative of a near-optimum interval of time for curing said tire, and,
    (d) curing said tire with a curing fluid at adequate temperature and sufficient pressure for the purpose, comprising,
        (i) deriving the difference in temperature between said ($T_{avg}$) and the sensed ($T_{act}$); and,
        (ii) obtaining a corrected curing time by (aa) adding to the average curing time, when the ($T_{act}$) is less than the ($T_{avg}$), the amount of time derived by multiplying said difference by a correction constant and by the average curing time, and, (bb) subtracting from the average curing time, when the ($T_{act}$) is greater than the ($T_{avg}$), the amount of time derived by multiplying said difference by said correction constant and by the average curing time;
    whereby the tire is cured within a curing period in an elapsed time mode, said curing period being the corrected curing time as obtained by step (ii) and said curing time being sufficiently accurate to provide a near-optimum number of cure equivalents at the point of least cure, without tracking the point of least cure.

7. The method of claim 6 wherein said correction constant is about 0.002 for each degree Fahrenheit of said difference (0.002/° F.), or about 0.0011 for each degree Celsius of said difference (0.0011/° C.) for passenger car tires.

8. The method of claim 6 wherein said curing fluid is steam, and, said difference in temperature is less than 30° F. (16.67° C.).

9. The method of claim 6 wherein said curing period is chosen from the period commencing with closing of said curing press to initiation of blowdown thereof, and, the duration of the press cycle.

* * * * *

UNITED STATES PATENT AND TRADEMARK OFFICE
CERTIFICATE OF CORRECTION

PATENT NO. : 4,779,206

DATED : October 18, 1988

INVENTOR(S) : William F. Mattson et al

It is certified that error appears in the above-identified patent and that said Letters Patent is hereby corrected as shown below:

Column 10, line 3, "or" should read -- of --.

Signed and Sealed this

Thirteenth Day of February, 1990

Attest:

JEFFREY M. SAMUELS

Attesting Officer     Acting Commissioner of Patents and Trademarks